(12) United States Patent
Goodman et al.

(10) Patent No.: US 10,569,278 B1
(45) Date of Patent: Feb. 25, 2020

(54) SYSTEM FOR REDUCING OXYGEN CONTAMINATION OF MILLED SILICON

(71) Applicant: Nanostar Inc., New Orleans, LA (US)

(72) Inventors: Jonathan Goodman, Evanston, IL (US); Gregory Alan Marus, New Orleans, LA (US)

(73) Assignee: Nanostar, Inc., New Orleans, LA (US)

( * ) Notice: Subject to any disclaimer, the term of this patent is extended or adjusted under 35 U.S.C. 154(b) by 0 days.

(21) Appl. No.: 16/599,219

(22) Filed: Oct. 11, 2019

Related U.S. Application Data (60) Provisional application No. 62/909,383, filed on Oct. 2, 2019.

(51) Int. Cl.
  *B02C 23/18* (2006.01)
  *B29B 13/10* (2006.01)
  *C01B 33/02* (2006.01)

(52) U.S. Cl.
  CPC ............. *B02C 23/18* (2013.01); *C01B 33/02* (2013.01); *B29B 13/10* (2013.01)

(58) Field of Classification Search
  CPC ................................ B29B 13/10; B02C 23/18
  See application file for complete search history.

(56) References Cited

U.S. PATENT DOCUMENTS

| | | | |
|---|---|---|---|
| 2015/0060581 A1* | 3/2015 | Santos ................. | B01D 61/142 241/21 |
| 2017/0363979 A1* | 12/2017 | Aoki .................... | G03G 9/0815 |
| 2018/0371202 A1* | 12/2018 | Holmegaard ........ | B01D 11/028 |
| 2019/0064672 A1* | 2/2019 | Murayama ............. | G03F 7/322 |

FOREIGN PATENT DOCUMENTS

CN          106564889 A      *   4/2017

OTHER PUBLICATIONS

Machine translation of CN 106564889, Translated Dec. 12, 2019, 5 Pages (Year: 2017).*

* cited by examiner

*Primary Examiner* — Gregory D Swiatocha (57) ABSTRACT

A milling system which includes a reservoir shaped and sized to contain a solvent or a slurry including the solvent and a material to be milled, a treatment column in communication with the reservoir, wherein the treatment column is configured to remove one or more of water, oxygen, and/or other impurities from the solvent, and a mill in fluid communication with the reservoir, wherein the mill is configured to triturate the material. The treatment column may be fluidly isolated from the rest of the system during milling.

20 Claims, 11 Drawing Sheets

SYSTEM FOR REDUCING OXYGEN CONTAMINATION OF MILLED SILICON

CROSS-REFERENCE TO RELATED APPLICATIONS

This disclosure claims the benefit of priority to U.S. Patent Application No. 62/909,383, filed 2 Oct. 2019, the entirety of which incorporated herein by reference.

FIELD OF THE INVENTION

The present disclosure is related to milling systems and methods of preparing such systems for operation by the removal of impurities.

BACKGROUND

Functionalization of silicon metal during a milling process renders the silicon highly sensitive to impurities, especially oxygen and moisture. The surface of fractured silicon includes reactive silicon radicals that can react with such impurities when present. Silicon oxygen bonds are thermodynamically favorable when compared to almost any other silicon bond, accordingly, silicon radicals quickly and efficiently react with any and all available oxygen atoms.

Unless housed in an inert atmosphere, milling equipment will have moisture and air trapped in the system, which can be introduced during cleaning operations or while open to the atmosphere during the loading of milling media. Excluding all sources of contamination during the handling of the milling equipment (vessel components) and/or starting materials (e.g., during loading) is an ongoing challenge. Existing methods of addressing the above presently involves the use of dry rooms and glove boxes, which have limitations related to cost, lack of throughput, and effectiveness.

The present disclosure provides systems and methods to remove impurities to a level that effectively reduces and/or eliminates the impurities and results in the reduction or elimination of the contamination of silicon metal during the milling process.

SUMMARY

One aspect of the disclosure is a milling system that includes a reservoir shaped and sized to contain a solvent or a slurry including the solvent and a material to be milled, a treatment column in communication with the reservoir, wherein the column is configured to remove one or more of water, oxygen, and/or other impurities from the solvent, and a mill in fluid communication with the reservoir, wherein the mill is configured to triturate the material combined with the solvent.

In other aspects of the disclosure a milling system is described, wherein the reservoir further comprises a mixer. The mixer may be, for example, an impeller, an agitator, or a recirculating pump. The mill may be a bead mill, a ball mill, a pin mill, a rotor-stator mill, a hammer mill, or a jet mill. The mill may be a shearing mill. The mill may be configured to mechanochemically functionalize a surface of the material to be milled.

The solvent may be nonaqueous. The solvent may include one or more of an alkane, an alkene, an alkyne, an arene, an alkyl halide, an aryl halide, an aldehyde, a ketone, an ester, an amide, an amine, and a nitrile. The solvent may include one or more of an alkane, an alkene, an alkyne, and an arene. The milling system may be configured to re-circulate the solvent through the reservoir, the treatment column, and the mill. The milling system may include a recirculation pump configured to circulate the solvent or the slurry to the mill and return the solvent or the slurry to the reservoir. The recirculation pump may be disposed after the reservoir and before the mill. The milling system and recirculation pump may be configured to circulate the solvent or the slurry to the treatment column and return the solvent or the slurry to the reservoir.

The material to be milled may be reactive with water during a milling process. The material to be milled may include one of silicon metal, germanium, tin, alloys thereof, and graphite. The material to be milled may be reactive with oxygen during a milling process. The material to be milled may be nonreactive with water and may be reactive with oxygen during a milling process.

The treatment column may be positioned before the mill relative to a drying-process flow through the milling system. The treatment column may be positioned after the mill relative to a drying-process flow through the milling system.

In another aspect of the present disclosure, the milling system includes a first treatment column disposed before the mill and a second treatment column disposed after the mill relative to a drying-process flow through the milling system. The treatment column may be configured to be fluidly, selectively isolated from the reservoir and the mill. The milling system may include a first valve before the treatment column and a second valve after the treatment column relative to a process flow through the system. The milling system may include a bypass conduit configured to permit flow of solvent or slurry directly from the reservoir to the mill when the first and second valves are closed.

The treatment column may include a desiccant. In one instance, the desiccant may be 3 Å molecular sieves, 4 Å molecular sieves, 5 Å molecular sieves, 13× molecular sieves, activated alumina, or a mixture thereof. Preferably, the desiccant is selected from 3 Å molecular sieves, 4 Å molecular sieves, activated alumina, and a mixture thereof. Even more preferably, the desiccant is 3 Å molecular sieves and/or 4 Å molecular sieves. The treatment column may be configured for regeneration of the desiccant. The treatment column may include molecular sieve desiccants and one or more of a copper catalyst for the removal of oxygen, or activated carbon. The copper catalyst and the activated carbon may be disposed in separate columns. The treatment column may include an oxygen collector.

The milling system may include a first and a second reservoir, wherein the system is configured to pump slurry from the first reservoir through the mill to the second reservoir. The system may be configured to pump slurry from the first reservoir through the mill to the second reservoir in a first fluid flow direction and then pump slurry from the second reservoir through the mill to the first reservoir in a second fluid flow direction.

In yet another aspect of the disclosure, a method is described that includes providing a nonaqueous solvent, circulating the solvent through a mill and a treatment column configured to remove water from the solvent, monitoring or calculating an amount of water in the solvent; and thereafter operating the mill to triturate a material to be milled. The method may include circulating the solvent through the mill and the treatment column, and further circulating the solvent through a reservoir shaped and sized to carry slurry that includes the solvent and the material to be milled. The method may include circulating the solvent through the mill and the treatment column, which dries the mill by the removal of water; and drying the solvent to below a selected amount of water in the solvent. The method may further include, after drying the mill, introducing to the mill a slurry that includes a material to be milled, and triturating the material in the mill. The method may include isolating the treatment column from the mill and the reservoir during operation of the mill. The method may further include introducing to the mill a slurry that includes a material to be milled and circulating the slurry through the treatment column during operation of the mill. The method may include removing one or more of oxygen or impurities via the treatment column or a second treatment column. The solvent may include one or more of an alkane, an alkene, an alkyne, an arene, an alkyl halide, an aryl halide, an aldehyde, a ketone, an ester, an amide, an amine, or a nitrile. The solvent may preferably include an alkane, an alkene, an alkyne, or an arene.

In a further aspect of the disclosure, a method of operating a mill includes providing a nonaqueous solvent, circulating the solvent through the mill and a treatment column configured to remove water from the solvent, reducing an amount of water in the solvent to less than about 1000 ppm, 100 ppm, 10 ppm, or 1 ppm; then introducing a material to be milled into the solvent to produce the slurry, and operating the mill to triturate the material, wherein the operating includes a) pumping the slurry from a first reservoir into the mill; b) milling the slurry in the mill; c) pumping the slurry into a second reservoir; d) pumping the slurry from the second reservoir into the mill; e) milling the slurry in the mill; f) pumping the slurry into the first reservoir; and g) repeating a-f until the material in the slurry is milled to a predetermined specification. The method may include wherein the circulating further includes circulating the solvent through at least one reservoir shaped and sized to carry a slurry including the solvent and the material to be milled.

BRIEF DESCRIPTION OF THE FIGURES

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
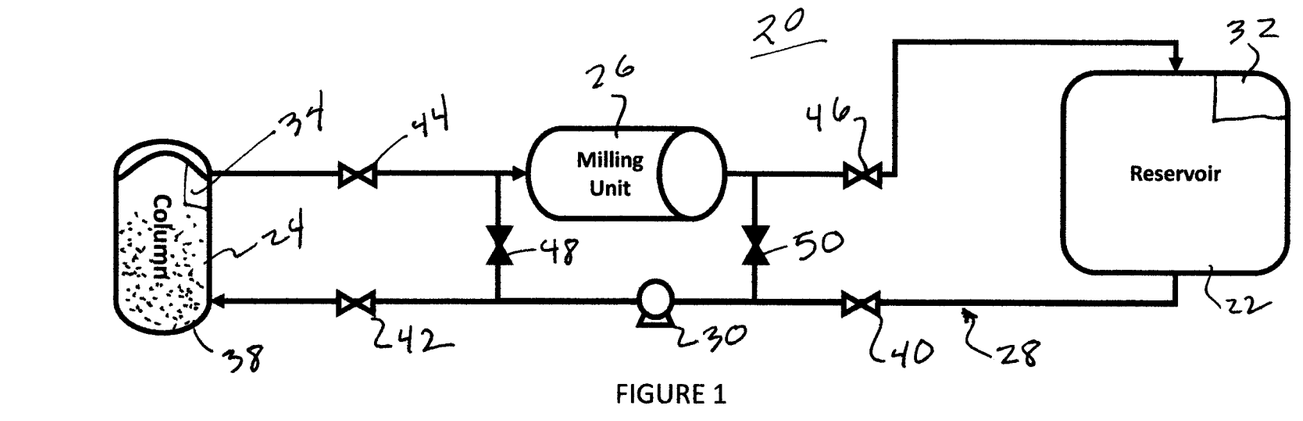
FIG. 1 is a milling system in a basic drying configuration.

It will be understood that features of the systems and methods illustrated herein will be explained using the context of the depicted flow directions unless noted otherwise. In other words, terms such as inlet and outlet, upstream and downstream, for example, will be referred to using the directional flow of material indicated by the arrows in the figures, for example as seen in FIG. 1, the arrows associated with conduits at the inlet of the reservoir, the inlet of the column, and the inlet of the milling unit, or as otherwise indicated in the text. Therefore, a fluid conduit entering a vessel as indicated as an arrow pointing toward the vessel will be referred to as an inlet and an inlet direction. Similarly, a conduit exiting the vessel as indicated by an arrow pointing away from the vessel will be referred to as an outlet. A feature in communication with the outlet of a vessel and receiving fluid flow from the indicated vessel will be referred as being downstream therefrom and a feature in communication with, or in a flow direction, preceding an inlet of the vessel will be referred to as being upstream of said vessel. Like reference characters will be used to denote like features of the figures.

Turning to the figures, a milling system 20 includes a reservoir 22 in fluid communication with a treatment column 24, and a mill 26. The reservoir 22, treatment column 24, and mill 26 are fluidly connected with fluid conduits 28, for example, in the form of pipes or the like as is well known, and a plurality of valves for directing the flow of materials through the conduits. One or more pump or compressor 30, of any suitable type, is provided in operative communication with the conduits 28 to move fluid and slurries through the conduits as indicated by the arrows in the figures. In one embodiment, the pump 30 is a pump that is particularly effective at pumping liquids and slurries.

The reservoir 22 may be any suitable closable and fluid sealable tank or tank-shaped container and may be configured to store and release materials into the system 20 via gravity feed or other means, such as pumping. The reservoir 22 is configured to permit recirculation of materials, preferably in a fluid, a flowable, or a slurry form, throughout the system 20. The reservoir 22 may be equipped with a mixer 32 as is known in the art for agitating/mixing materials. The reservoir 22 is sized and shaped to receive and contain a material to be milled and a fluid carrier, also referred herein as a solvent, for the material, both of which will be described in more detail hereinbelow. The material to be milled may include one of silicon metal, germanium, tin, alloys thereof, and graphite, for example.

The treatment column 24 may be a container that is also fluid sealable and is in fluid communication with the reservoir 22. The column 24 may be sized and shaped to contain desiccant 34 for removal of water from the solvent. The desiccant 34 may be molecular sieve desiccants, such as 3 Å molecular sieves, 4 Å molecular sieves, 5 Å molecular sieves, 13× molecular sieves or a mixture thereof, and/or activated alumina. Preferably, the desiccant is selected from 3 Å molecular sieves, 4 Å molecular sieves, activated alumina, and a mixture thereof. Even more preferably, the desiccant is 3 Å molecular sieves and/or 4 Å molecular sieves. The treatment column 24 may include desiccant 34 in the form of molecular sieve desiccants. The treatment column 24 may include one or both of a copper catalyst for the removal of oxygen or activated carbon.

Figure 12:
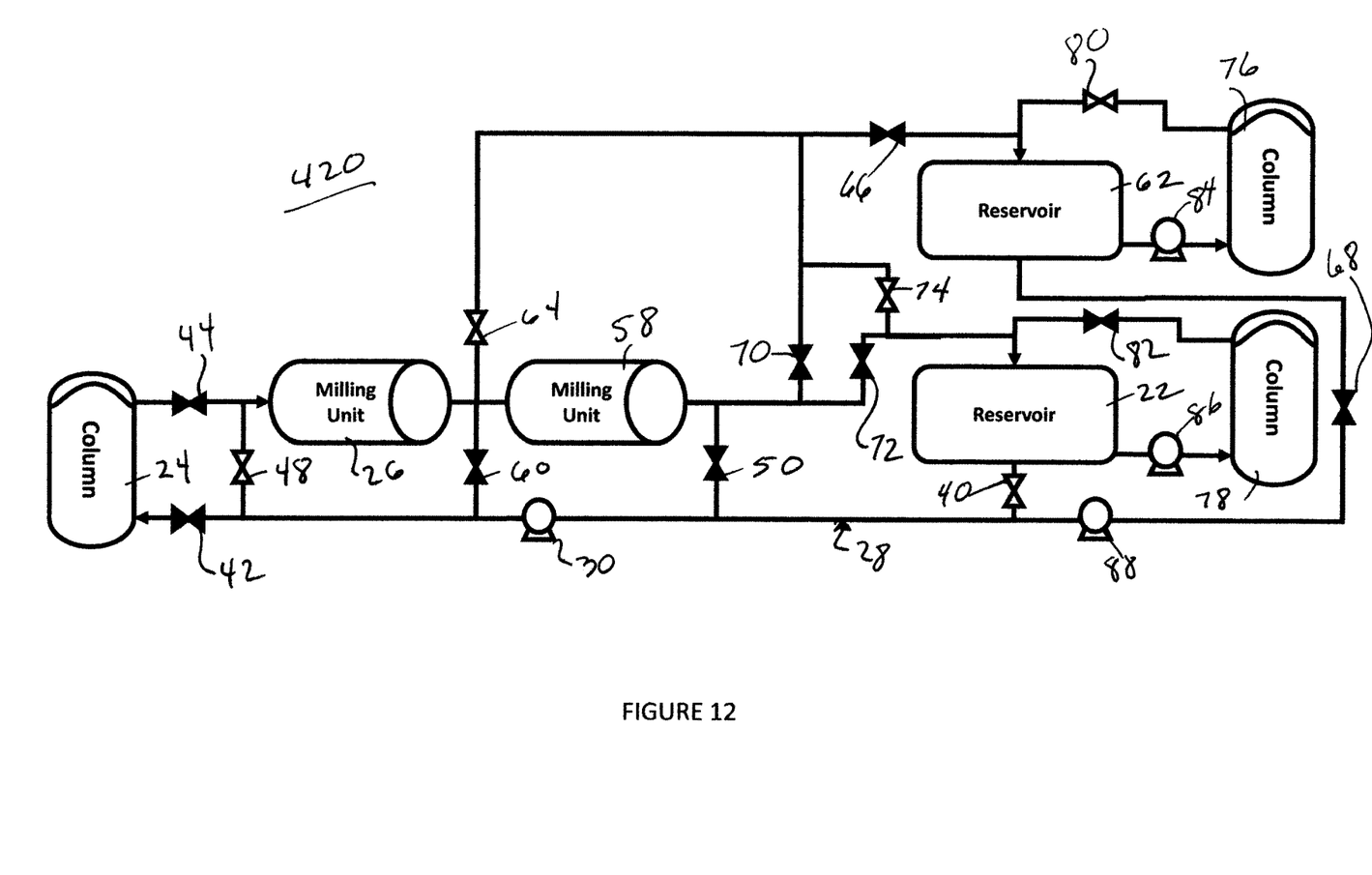
FIG. 12 is another aspect of a milling system according to the disclosure that permits different operations to be conducted simultaneously.

In an alternate embodiment, the treatment column 24 may be provided as two or more separate columns, each of the separate columns including a different purifying constituent, i.e., a first column may include the desiccant 34, and a second column may include a catalyst for the removal of oxygen (see FIG. 12). Further, for example, a copper catalyst and an activated carbon may be disposed in separate columns (see FIG. 12).

Figure 13:
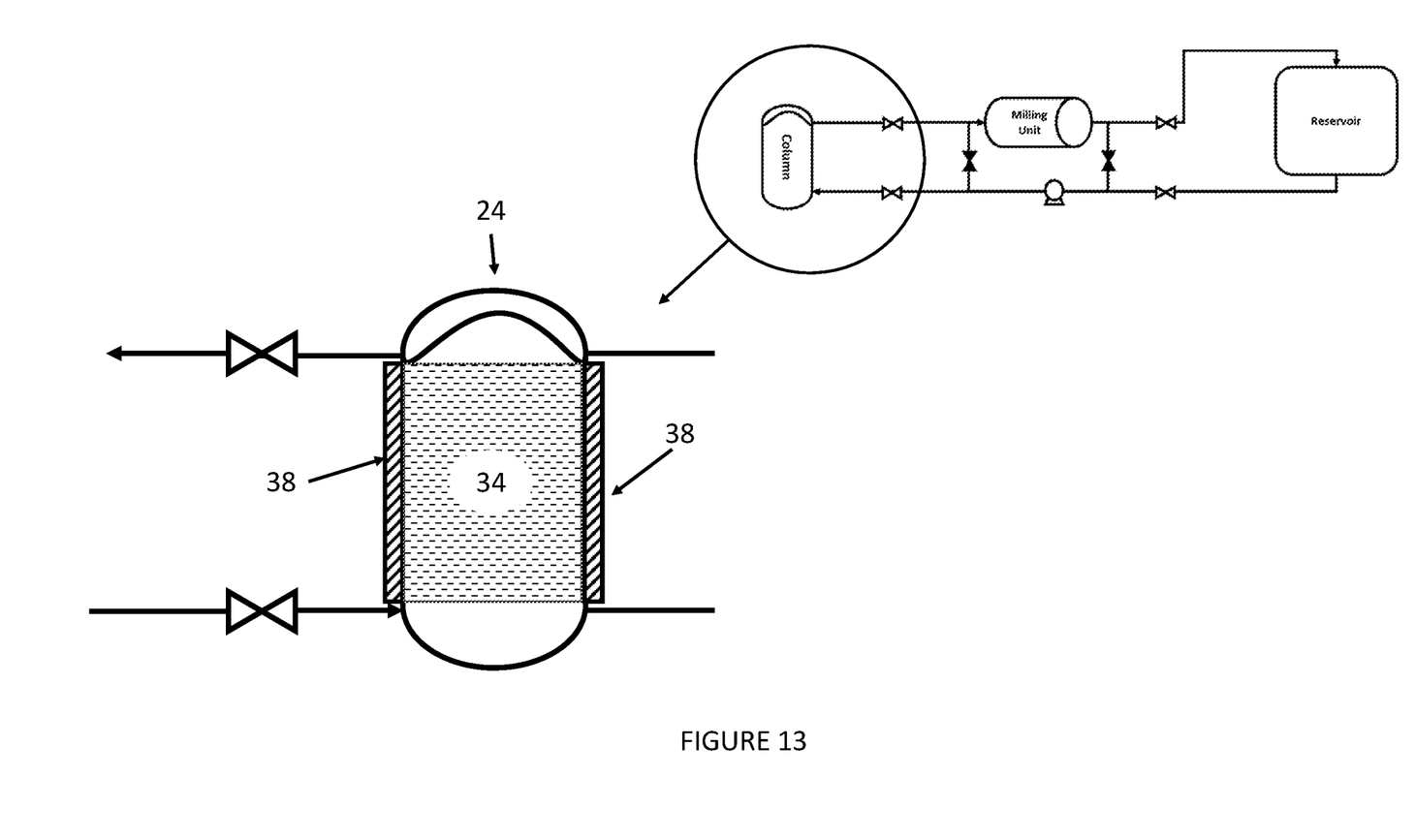
FIG. 13 is another aspect of a milling system according to the disclosure that features regeneration of the desiccant carried in the column.

The treatment column 24 may be configured for regeneration (see FIG. 13) of the desiccant 34 via heaters 38, for example, as indicated in FIG. 1 in connection with the column. One or more other methods for regenerating the desiccant 34 may be used alone or in combination with heat such as increased pressure, purging with a carrier gas, and vacuum.

The mill 26 may be any suitable mill for triturating silicon metal or any material with similar milling requirements. The mill 26 may be a bead mill, a ball mill, a pin mill, a rotor-stator mill, a hammer mill, or a jet mill. In one embodiment, the mill 26 is a shearing mill.

The reservoir 22, treatment column 24, and mill are all fluidly connected by conduits 28, which may be in the form of pipes, such as stainless steel pipes. Flow of material, for example in the form of a slurry, through the conduits 28 is controlled by an arrangement of valves and one or more fluid pump 30, which may be disposed between an outlet side of the reservoir 22 and an inlet side of the treatment column 24. The pump 30 may be any pump, compressor, or the like that is suitable for pumping fluids and a slurry of solid particles in a liquid.

Figure 2:
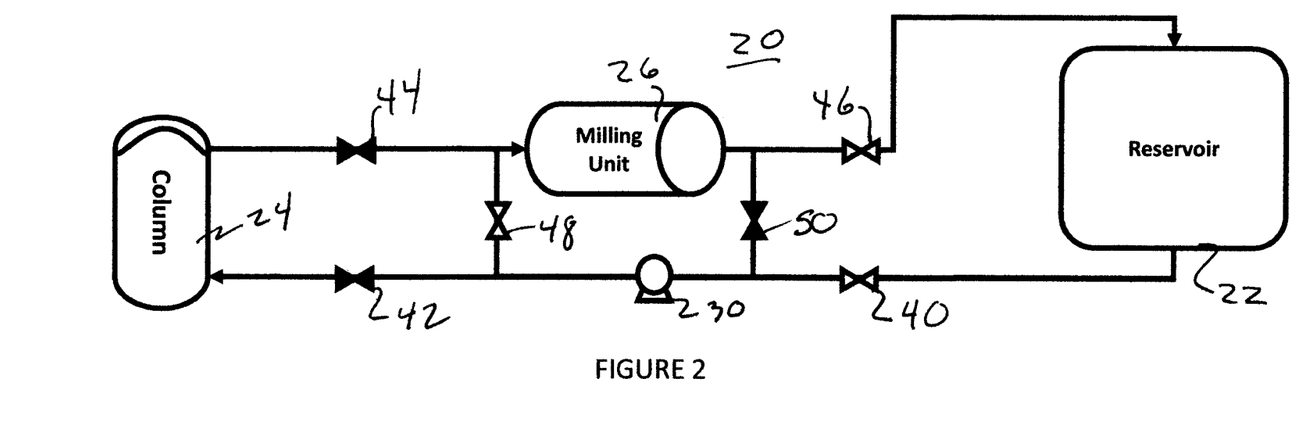
FIG. 2 is a milling system in a basic milling configuration.
Figure 3:
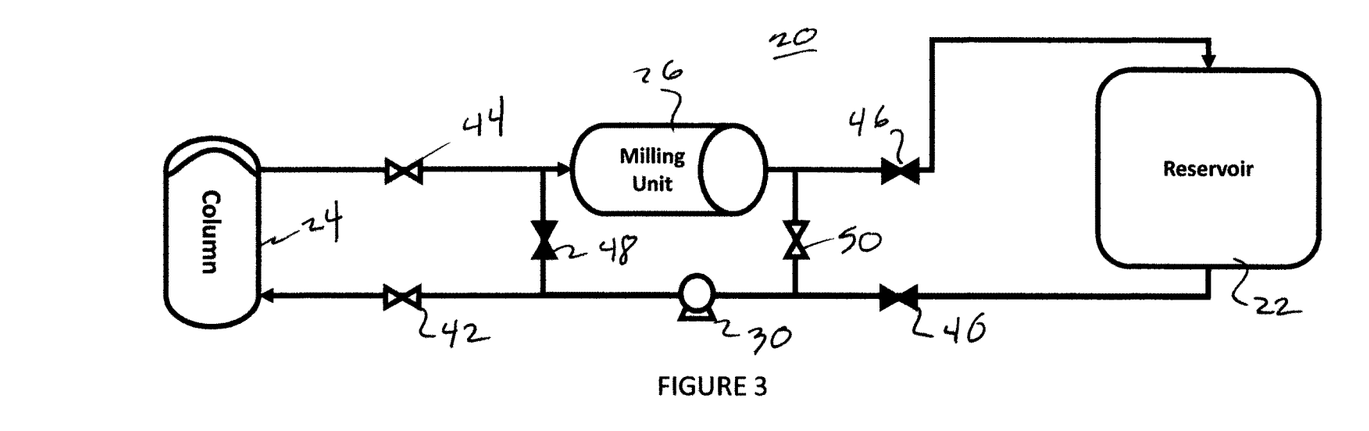
FIG. 3 is a milling system in an isolated drying configuration.

Referring specifically to the system 20 shown in FIGS. 1-3, the system includes a reservoir 22, a treatment column 24 and a milling unit 26 fluidly interconnected by a system of conduits 28. The system 20 includes a reservoir outlet valve 40 downstream of the reservoir and pump 30 downstream of the reservoir outlet valve 40. A treatment column inlet valve 42 is disposed downstream of the pump 30 and upstream of the treatment column 24. A treatment column outlet valve 44 is disposed downstream of the treatment column 24. Opening both treatment column inlet valve 42 and treatment column outlet valve 44 permits fluid flow pumped by pump 30 to be acquired from the reservoir 22 to pass through the treatment column 24 as shown in FIG. 1.

The milling unit 26 is disposed, in FIG. 1, downstream of the treatment column outlet valve 44. Fluid from the treatment column 24 passes through the mill 26, leaves the mill through mill outlet valve 46, and is returned to the reservoir 22.

Two valves in the configuration shown in FIG. 1 may be closed to direct flow through the system 20 for basic drying. A column bypass valve 48, disposed and extending between the pump 30 and the inlet side of the mill 26, when closed as in FIG. 1, directs solvent through the treatment column 24 from the pump 36. Similarly, the reservoir bypass valve 50 can be closed to form a drying loop through the reservoir 22, column 24, and mill 26.

Further, a reservoir bypass valve 50 that extends and operates between the outlet of the reservoir 22 and outlet of the mill 26 can be closed such that material circulates through all main elements of the system 20. FIG. 1 therefore shows a system configuration where basic drying can be conducted.

Drying refers to the circulation of one or more fluid, such as a solvent with properties that removes water by acquiring water from the system environment and elements, through the column 24 so that water can be removed from the solvent. Further, the solvent may be circulated through column 24 and mill 26, whereby the interior and inside elements of the mill is dried (via removal of water) before milling. In FIG. 1, all of the mill system elements 22, 24, 26 are dried and prepared for introduction of the material to be milled by circulating the solvent throughout the system, whereby water is removed by sieves or the like located inside the column 24.

It will be understood therefore that an aspect of the invention is circulating one or more solvent through at least the mill 26 and the treatment column 24 so that water and optionally other impurities are reduced or removed from the system. In addition, the solvent may also be circulated through the reservoir 22. The solvent is circulated through the system 20 before addition of the material to be milled into the system.

The solvent may include one or more of an alkane, a hetero-alkane, an alkene, an alkyne, an arene, an alkyl halide, an aryl halide, an aldehyde, a ketone, an ester, an amide, an amine, and a nitrile. Preferably, the solvent includes one or more of an alkane, an alkene, an alkyne, and an arene. More preferably, the solvent includes an alkane, a hetero-alkane, and/or an arene.

Preferably, the alkane is a saturated hydrocarbon that can be liner (n-alkane), branched (single or multiple branches), cyclic, or a combination thereof. In one instance, the alkane has a molecular formula of $C_xH_y$, preferably wherein x is in the range of 4 to about 25 and, preferably, where y=2x+2. In another instance, the alkane can be cyclic and, for example, have a molecular formula where y=2x (monocyclic), 2x−2 (dicyclic), or 2x−4 (tricyclic); preferably monocyclic (e.g., cyclohexane). Preferably, x is in the range of 5-20, more preferably in the range of 6-18, and even more preferably in the range of 6-12. In one preferable example, the alkane is linear. In another preferable example, the alkane is branched. In another preferably example, the alkane has a melting point below about 150° C., 140° C., 130° C., 120° C., 110° C., 100° C., or 90° C. Even more preferably, the alkane is liquid at room temperature (20-25° C.). In another example, the alkane is selected from pentane, hexane, heptane, octane, nonane, decane, undecane, dodecane, tridecane, tetradecane, pentadecane, hexadecane, heptadecane, octadecane, nonadecane, icosane, cyclopentane, cyclohexane, cycloheptane, cyclooctane, cyclononane, and cyclodecane. In still another example, the alkane can be a cycloalkane (e.g., cyclopentane, cyclohexane, cycloheptane, or cyclooctane) having one or more alkyl chains extending therefrom, including a methyl, ethyl, propyl, butyl, pentyl, hexyl, heptyl, octyl chains.

The hetero-alkane is a saturated hydrocarbon that can be liner (n-alkane), branched (single or multiple branches), cyclic, or a combination thereof carrying a heteroatom functionality. Generally, the hetero-alkane can have the formula $C_nH_mX_o$, where n is an integer from about 3 to about 80, preferably about 3 to about 60, or about 3 to about 50, or about 3 to about 40, or about 4 to about 30, or about 4 to about 25; o is an integer selected from 1, 2, and 3, preferably 1. In this formula X represents the heteroatom of the heteroatom functionality and can be selected from the group consisting of an oxygen atom, a nitrogen atom, a sulfur atom, a phosphorous atom, a fluorine atom, a chlorine atom, a boron atom, and a combination thereof (i.e., when o is greater than 1). More preferably, the heteroatom (X) is selected from the group consisting of an oxygen atom a nitrogen atom, and a combination thereof. The heteroatom functionality is preferably saturated or otherwise devoid of pi-bonding to other heteroatoms or carbon. Preferable heteroatom functionalities are 1°, 2°, or 3° alcohols, ethers, 1°, 2°, or 3° amines, or mixtures thereof. In another preferably example, the hetero-alkane has a melting point below about 150° C., 140° C., 130° C., 120° C., 110° C., 100° C., or 90° C.

In one example, the hetero-alkane includes an alcohol functionality, that is, includes an alkanol (e.g., propanol, butanol, pentanol, hexanol, heptanol, octanol, nonanol, decanol, undecanol, dodecanol, tridecanol, tetradecanol, pentadecanol, hexadecanol, heptadicanol, octadecanol, nondecanol, and icosanol), preferably the alcohol functionality is tertiary (3°). The alkanol preferably has a molecular formula of $C_xH_yO_z$, preferably wherein x is in the range of 3 to about 25 or 4 to 25, where y=2x+2, and where z is an integer selected from 1, 2, or 3. In another instance, the alkanol can be cyclic and, for example, have a molecular formula where y=2x (monocyclic), 2x−2 (dicyclic), or 2x−4 (tricyclic); preferably monocyclic (e.g., cyclohexanol). Preferably, x is in the range of 5-20, more preferably in the range of 6-18, and even more preferably in the range of 6-12; preferably z is 1.

In another example, the hetero-alkane include an ether functionality, that is, includes an alkyl-ether. The alkyl-ether preferably has a molecular formula of $C_xH_yO_z$, preferably wherein x is in the range of 4 to about 25, where y=2x+2, and where z is in the range of 1 to about 5. In one instance, the alkyl-ether is a mono-ether where z=1, the ether can be symmetric (e.g., diethylether, dipropylether, dibutylether, dipentylether, dihexylether) or asymmetric (e.g., methylpropylether, methylhexylether, isoproylhexylether, cyclohexylhexylether). Examples include a methylalkylether, ethylalkylether, propylalkylether, butylalkylether, pentylalkylether, hexylalkylether, heptylalkylether, octylalkylether, nonylalkylether, and decylalkylether; wherein the alkyl group can be the same or different, in some instances the alkyl group is selected from a propyl, butyl, pentyl, hexyl, heptyl, octyl, nonyl, or decyl group. In another instance, the alkyl-ether can be heterocyclic (i.e., where in the oxygen atom is part of the cycle) and, for example, have a molecular formula where y=2x (monocyclic), 2x−2 (dicyclic), or 2x−4 (tricyclic); preferably monocyclic (e.g., tetrahydrofuran (oxolane), tetrahydropyran (oxane), oxepane, oxocane, oxonane, oxecane, 1,4-dioxane). Preferably, x is in the range of 5-20, more preferably in the range of 6-18, and even more preferably in the range of 6-12; preferably z is 1.

In still another preferable example the hetero-alkane includes an amine functionality (i.e., an alkylamine). In instances wherein the amine is a secondary amine (i.e., a dialkylamine), or tertiary amine (i.e., a trialkylamine), the hydrocarbon groups affixed to the amine can be the same or different (i.e., both are saturated hydrocarbons). In one instance, the alkylamine is a primary amine and has a molecular formula of $CxH_y(NH_2)z$, preferably wherein x is in the range of 4 to about 25, where y=2x+2−z, and where z is in the range of 1 to about 5; preferably, z is 1 or 2; more preferably z is 1. Examples include butylamine, pentylamine, hexylamine, heptylamine, octylamine, nonylamine, decylamine, undecylamine, dodecylamine, tridecylamine, tetradecylamine, pentadecylamine, hexadecylamine, heptadicylamine, octadecylamine, nondecylamine, icosylamine, and the remainder of the homologous series for the range of x of 4 to about 25. In another instance, the alkylamine is a secondary amine and has a molecular formula of $(C_xH_y)_2(NH)_z$, preferably wherein x is in the range of 3 to about 25, where y=2x+1, and where z is in the range of 1 to about 5; referably, where z is 1 or 2; more preferably where z is 1. In one instance, the secondary alkylamine is symmetric (i.e., where the alkyl groups carried on the nitrogen atom are the same; e.g., diethylamine, dipropylamine, dibutylamine, dipentylamine, dihexylamine, diheptylamine, dioctylamine, dinonylamine, didecylamine, diundecylamine, didodecylamine, ditridecylamine, ditetradecylamine, dipentadecylamine, dihexadecylamine, diheptadicylamine, dioctadecylamine) or asymmetric (e.g., (R)(R')NH where R and R' are different and selected from methyl, ethyl, propyl, butyl, pentyl, hexyl, heptyl, octyl, nonyl, decyl, undecyl, dodecyl, tridecyl, tetradecyl, pentadecyl, hexadecyl, heptadicyl, octadecyl, nondecyl, and icosyl).

In still another instance, the alkylamine is a tertiary amine and has a molecular formula $(C_xH_y)_3N$, where x is in the range of 3 to about 30 and y=2x+1. The tertiary amine [(R)(R')(R")N] can be symmetric (i.e., (R)=(R')=(R")) or asymmetric (e.g., (R)=(R')≠(R") or (R)≠(R')≠(R"))), where (R) (R') and (R") are selected from propyl, butyl, pentyl, hexyl, heptyl, octyl, nonyl, decyl, undecyl, dodecyl, tridecyl, tetradecyl, pentadecyl, hexadecyl, heptadicyl, octadecyl, nondecyl, and icosyl. Some examples include dimethylhexylamine, and diethyloctylamine.

In still another instance, the alkylamine can be a cyclic secondary or cyclic tertiary amine wherein the nitrogen atom is part of the cycle. Examples include but are not limited to pyrrolidine, piperidine, morpholine, quinuclidine, DABCO, azocane, azonane, piperazine, and the alkyl-branched derivatives thereof.

The arene is, preferably, a monocyclic arene. In a preferable example, the arene has a melting point below about 150° C., 140° C., 130° C., 120° C., 110° C., 100° C., or 90° C. Even more preferably, the arene is liquid at room temperature (20-25° C.). In another example, the alkane is selected from benezene, toluene, xylene, mesitylene, ethyl benzene, fluorobenzene, difluorobenzene, trifluorobenzene, tetrafluorobenzene, pentafluorobenzene, perfluorobenzene, diclorobenzene, triclorobenzene, tetraclorobenzene, pentaclorobenzene, perclorobenzene. Preferably, the arene is benzene, toluene, xylene, mesitylene or a mixture thereof. In still another example, the arene can be an alkyl-functionality affixed to the aromatic ring, the alkyl-functionality can be a methyl, ethyl, propyl, butyl, pentyl, hexyl, heptyl, and/or octyl chain.

FIG. 2 shows a basic milling operation. In this configuration, the system 20 is configured to isolate the column 24 from circulation by closing the column inlet and outlet valves 42, 44 and opening the column bypass valve 48. The reservoir 22 is also placed in the circuit by opening the mill outlet valve 46 and the reservoir outlet valve 40. This system configuration may be used during basic milling of the material to be milled in slurry form after drying of the system elements. The sieves of the column 24 may be simultaneously rejuvenated for used in subsequent drying operations because it is isolated from other elements of the system 20.

FIG. 3 shows drying of only the milling unit 26 by circulating the solvent through the column 24 and mill only. The reservoir 22 may be therefore isolated from the circuit and, for example, may be charged with material to be milled, cleaned, or merely idled until such a time that material is to be added to the system 20 for milling or other operations.

Figure 4:
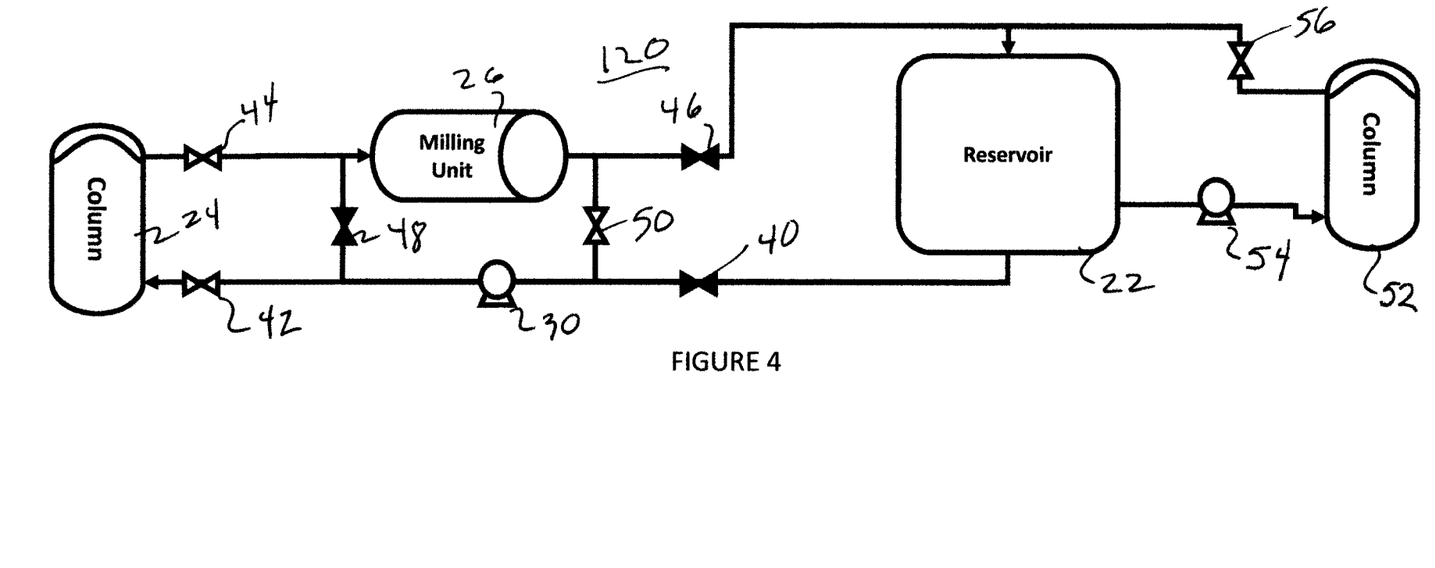
FIG. 4 is a milling system in a reservoir preparation and isolated drying configuration.

The system 120 of FIG. 4 is similar to the configuration detailed above in connection with FIGS. 1-3 with the addition of a second treatment column 52. The second treatment column 52 is constructed like the treatment column 24, and placed in fluid communication with the reservoir 22. A second pump 54 that is configured to receive material from the reservoir 22 is configured to pump the materials from the reservoir to the second column 52. A second column outlet valve 56 controls the flow of material exiting the second column 52.

The system configuration 120 shown in FIG. 4 illustrates dual drying of the reservoir 22 and the mill 26 by creating two separate isolated drying circuits with the arrangement of the valves as shown resulting in the reservoir 22 being in a closed drying circuit with the second column 52 that is fluidly isolated from a closed drying circuit wherein the mill 26 is in fluid communication with column 24. Because the mill outlet valve 46 is closed and the reservoir outlet valve 40 is closed, fluids flowing through the mill 26 and the reservoir 22 are not mixed or exchanged.

Figure 5:
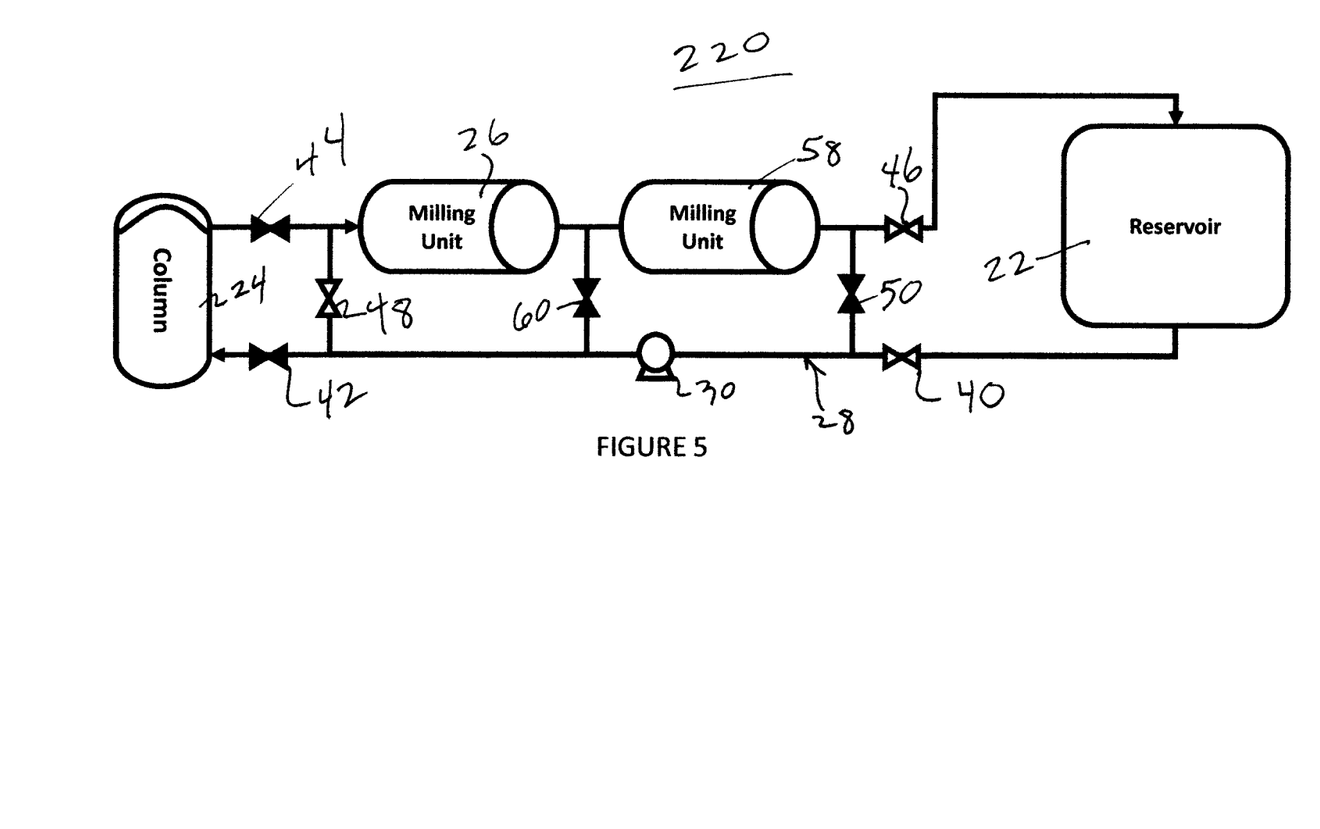
FIG. 5 is a milling system in a multi-pass milling configuration.

FIG. 5 illustrates a system configuration 220 that is similar in layout to the system 20 of FIGS. 1-3 with the addition of a second mill 58 that is disposed in series with the mill 26. In this configuration, which illustrates a system for multi-pass milling, material flowing through the system 220 first is triturated in mill 26 and then further triturated in second mill 58. A further valve, herein referred to a crossover valve 60, is provided between the mills 26, 58 and is disposed in fluid connection with the conduit 28 downstream of the pump 30.

FIGS. 6-11 illustrates a system configuration 320 that is similar in layout to the system 220 of FIG. 5 with the addition of a second reservoir 62. The system 320 further includes a first supply valve 64 from the outlet of the mill 26 and leads to a second reservoir inlet valve 66. The system 320 includes a second reservoir outlet valve 68 which leads to the conduit 28 that conducts material from the reservoir outlet valve 40. A second supply valve 70 is positioned after the second mill 58 and may feed to either the first reservoir 22 via a third supply valve 72 or the second reservoir 62 through the second reservoir inlet valve 66. A fourth supply valve 74 when closed, directs isolated flow from the second supply valve 70 only to the second reservoir 62 and isolated flow from the third supply valve 72 only to the first reservoir 22.

Figure 6:
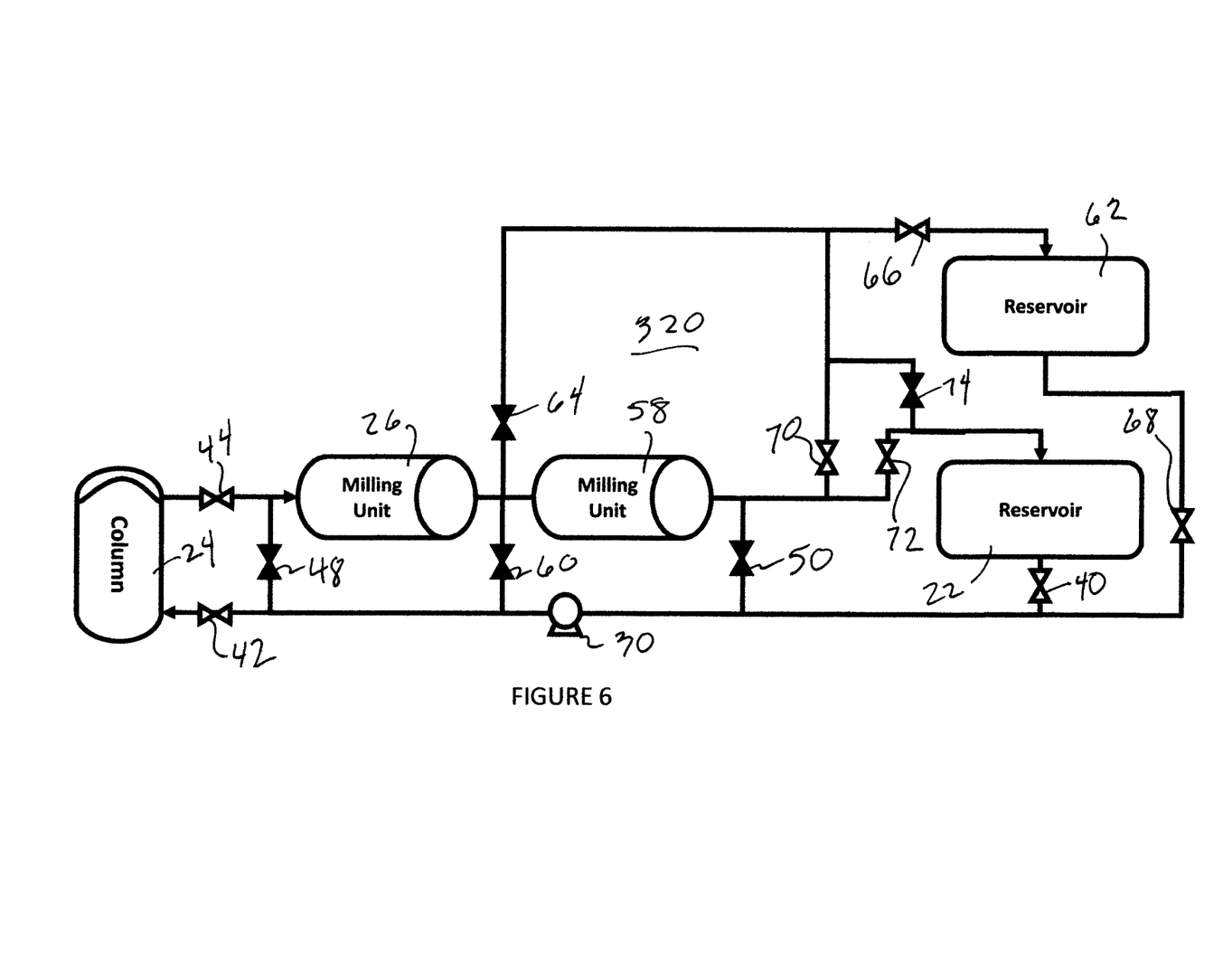
FIG. 6 is a milling system including drying to two mills and two reservoirs.

Functionally, the configuration shown in FIG. 6 illustrates a method of drying both mills 26, 58 and both reservoirs 22, 62. Flow is as follows: from reservoir 22, 62, solvent is pumped via pump 30 through column 24. Solvent flows in series through first mill 26 and then second mill 58. Solvent is then directed back to first and second reservoirs 22, 62 in parallel.

Figure 7:
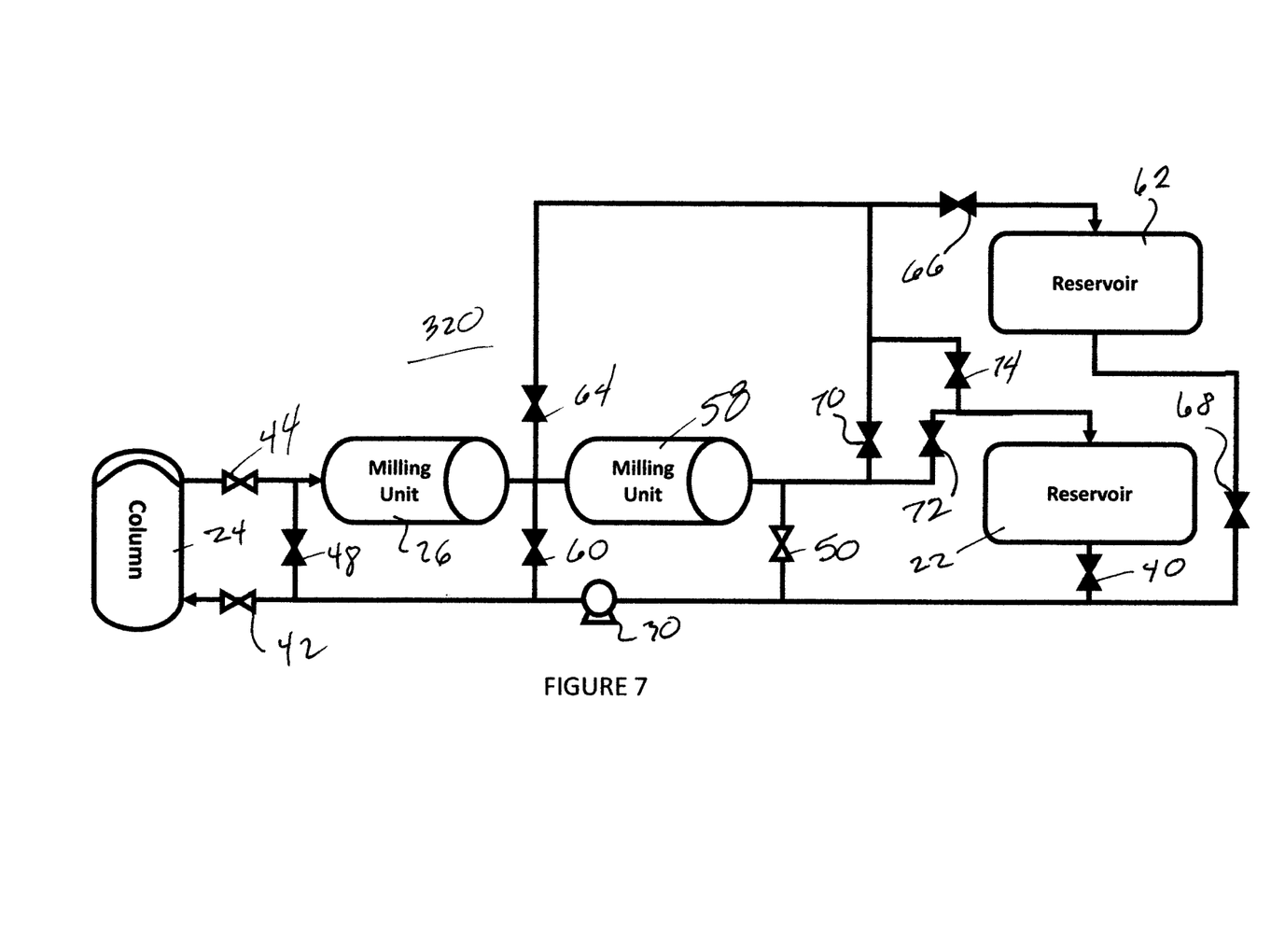
FIG. 7 is a milling system including recirculating drying of two mills.

FIG. 7 illustrates a system configuration that illustrates a method of recirculating drying of both mills. In this configuration, the first and second reservoirs 22, 62 are isolated from flow by closing the second supply valve 70, the third supply valve 72 and the fourth supply valve 74. Also, the first supply valve 64 and the second reservoir inlet valve 66 are closed, as well as the reservoir outlet valves 40, 68. Closing the column bypass valve 48, crossover valve 60 and leaving open the reservoir bypass valve 50, and the column inlet and outlet valve 42, 44 permits pump 30 to circulate solvent through column 24 and both milling units 26, 58.

Figure 8:
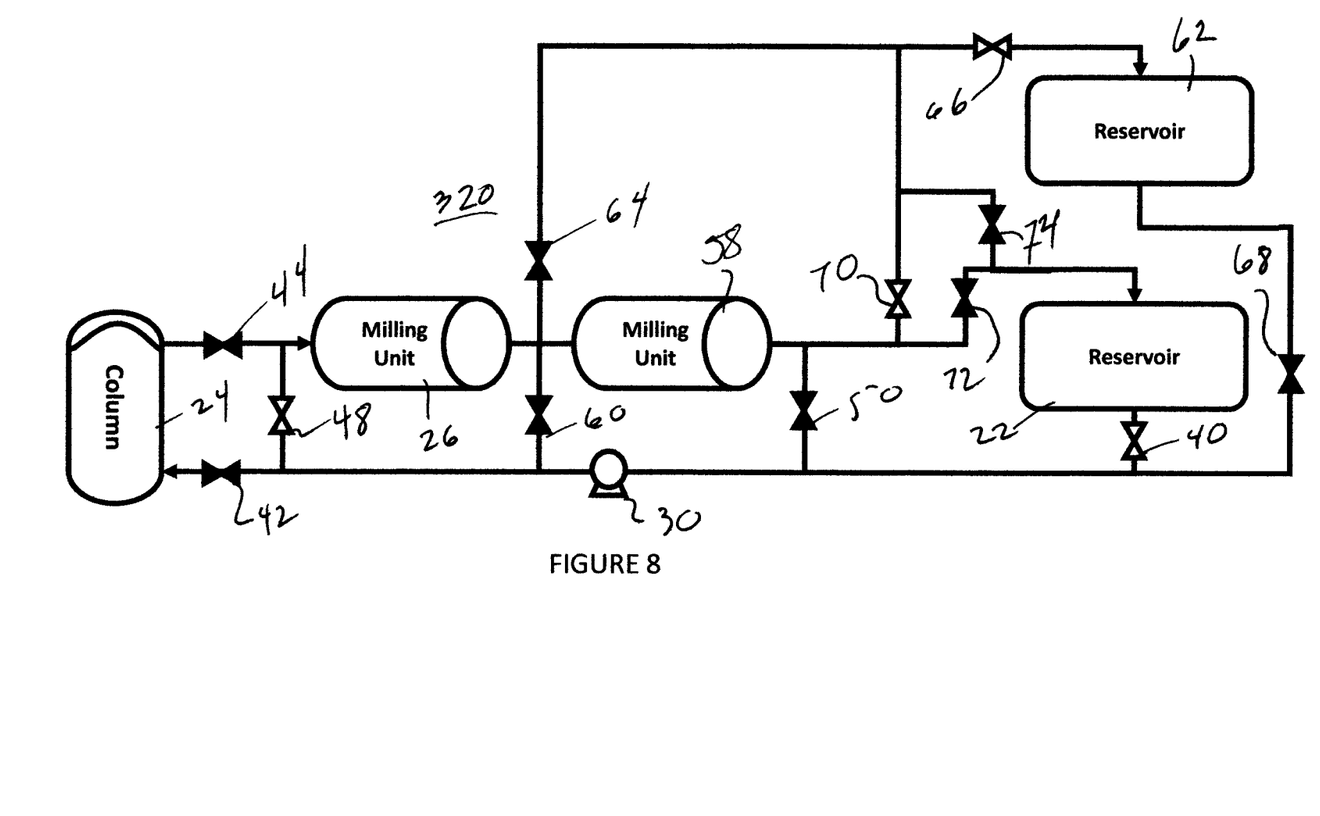
FIG. 8 is a milling system including a first of two "ping-pong" milling operations wherein slurry flows in a direction from a first reservoir through milling units and to a second reservoir.
Figure 9:
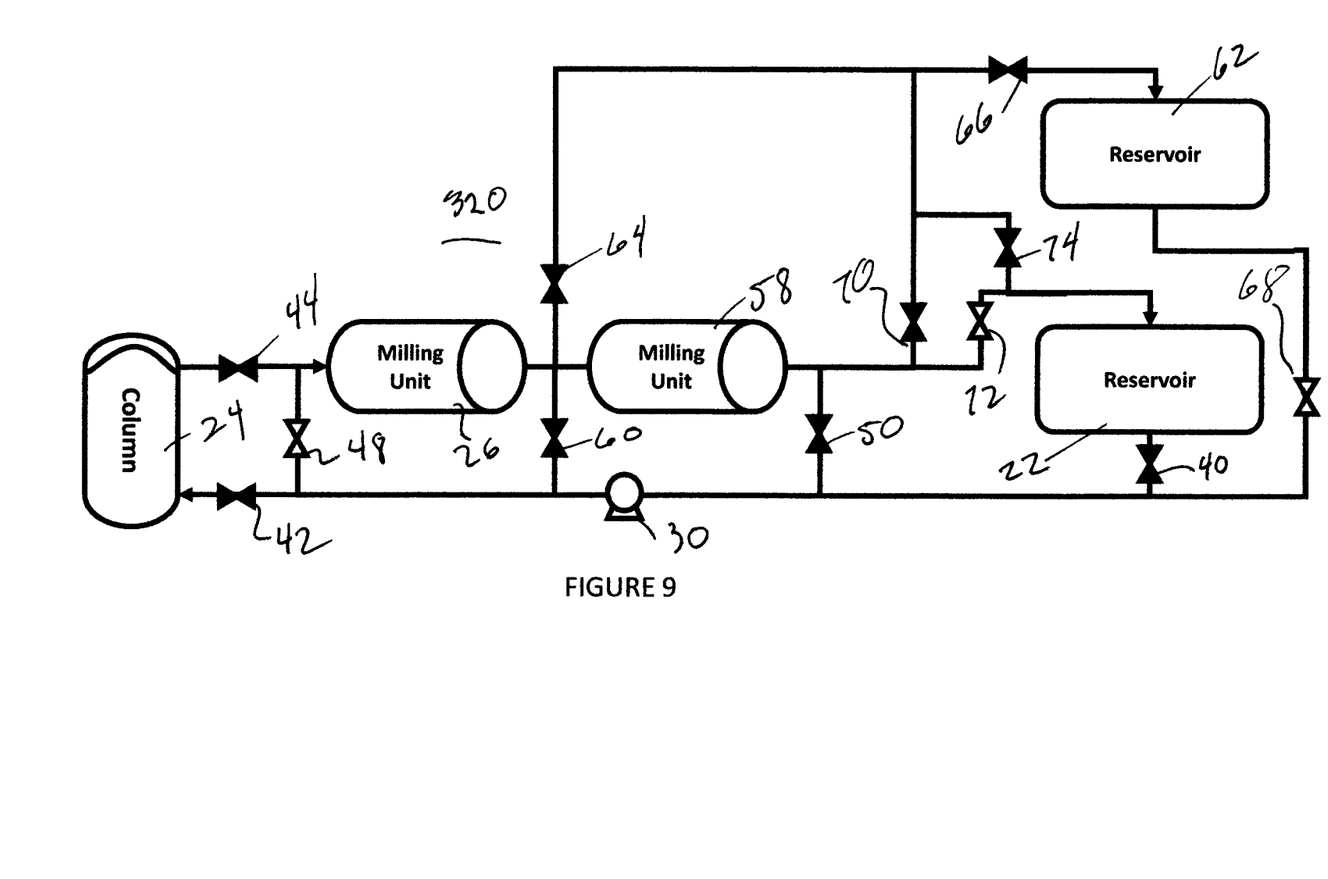
FIG. 9 is the milling system of FIG. 8 wherein a second of two "ping-pong" milling operations wherein slurry flows in a direction from the second reservoir through milling units and to the first reservoir.

FIGS. 8 and 9 respectively show first and second configurations of a milling system 320 yielding a bi-directional or multi-pass milling method. In general, material to be milled and solvent flow from one of the two reservoirs 22 or 62, through both milling units 26, 58 to the other of the reservoirs. In FIG. 8, the reservoir from which material is drawn is reservoir 22 and reservoir 62 is the reservoir to which material is deposited after triturating. In FIG. 9, the reservoir from which material is drawn is reservoir 62 and reservoir 22 is the reservoir to which material is deposited after triturating. This "ping-pong" approach may be continued until the material is milled to a selected specification, for example by sample monitoring at one or both reservoirs 22, 62 for example.

In this embodiment, the column 24 is isolated from material flow regardless of flow direction through the system 320. This is accomplished by closing the column inlet and outlet valve 42, 44.

Material to be milled and a carrier (the solvent) is pumped, for example, as shown in FIG. 8, from the first reservoir 22 by pump 30, through open column bypass valve 48 and sequentially through the first and second milling units 26, 58. Material flow is directed to the second reservoir 62 from milling unit 58 via open second supply valve 70 and open second reservoir inlet valve 66. Closed third and fourth supply valves 72, 74 prevent material from re-entering the first reservoir 22.

In FIG. 9, material flow begins by exiting second reservoir 62 via second reservoir outlet valve 68, is pumped through open column bypass valve 48 and sequentially through the first and second milling units 26, 58. In this direction, the second supply valve 70 and the fourth supply valve 74 are closed and therefore material is directed via open third supply valve 72 into the first reservoir 22.

Figure 10:
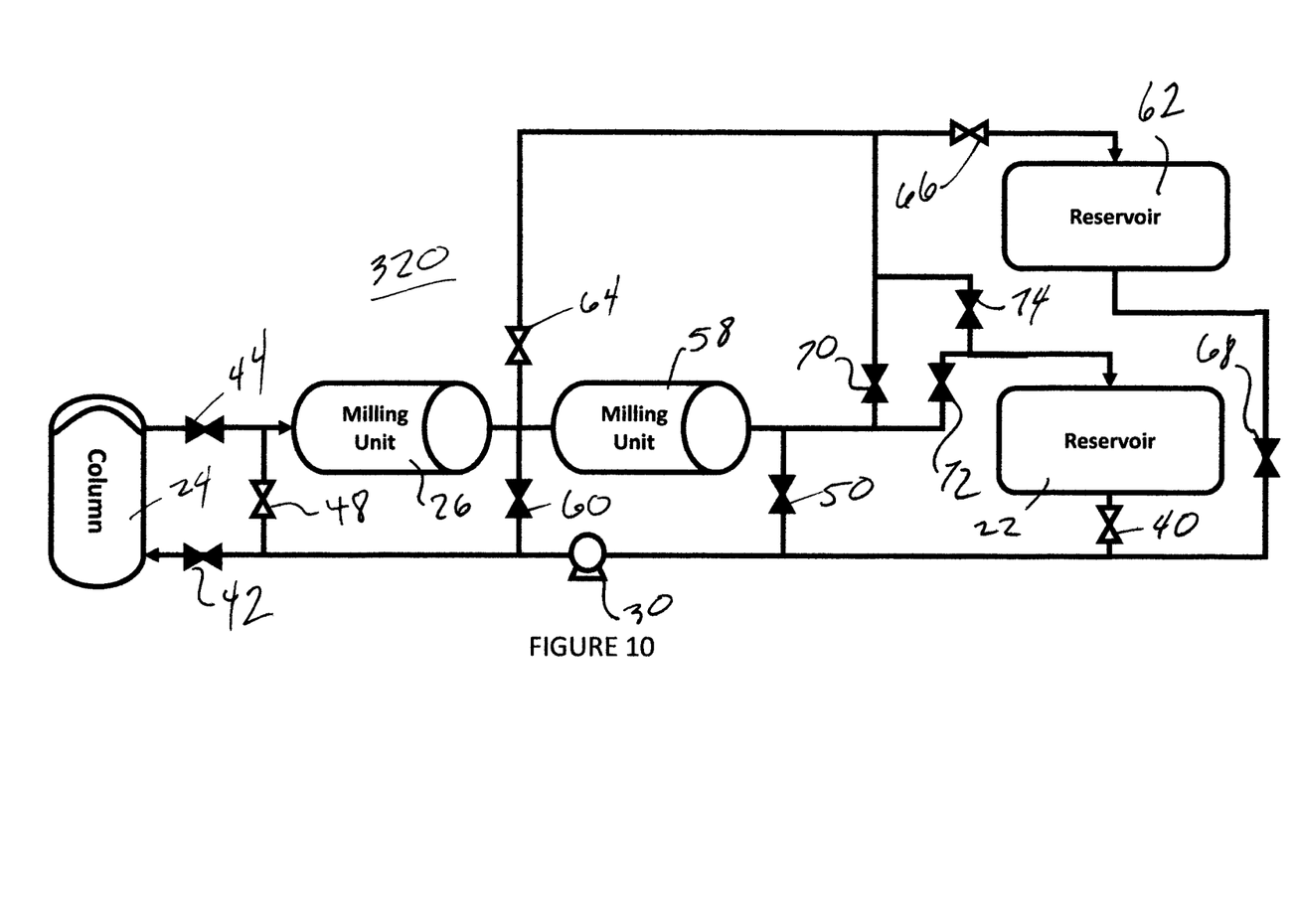
FIG. 10 is a milling system using a single pass milling operation in an operation wherein slurry flows from a first reservoir, through one milling unit, and to a second reservoir.
Figure 11:
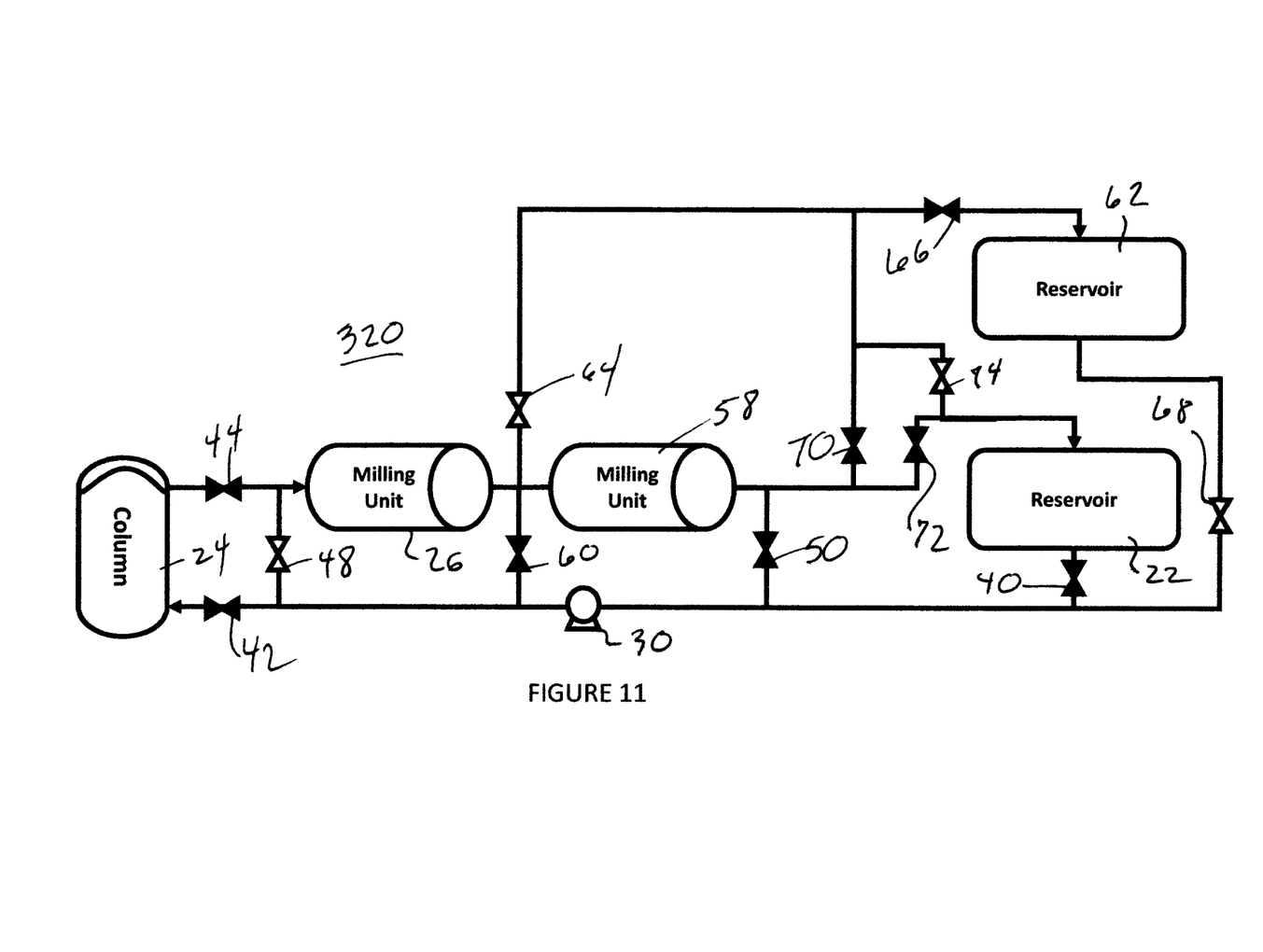
FIG. 11 is the milling system of FIG. 10 wherein the flow direction is from the second reservoir, through one milling unit, and to the first reservoir.

FIGS. 10 and 11 respectively show first and second configurations of a milling system 320 yielding a single pass milling operation in which one milling unit is used. In this arrangement, the other of the milling units is isolated from flow. Turning to FIG. 10, material to be milled and a carrier (the solvent) is pumped, for example, from the first reservoir 22, by pump 30, through open column bypass valve 48 and through the first milling unit 26. Material is prevented from passing through the second milling unit 58 by closing the second, third, and fourth supply valves 70, 72, 74. Also, reservoir bypass valve 50 and crossover valve 60 are closed. The first supply valve 64 is open so that flow from milling unit 26 is directed through the second reservoir inlet valve 66 and into the second reservoir 62. The second reservoir outlet valve 68 is closed so that material flows into and not out of the second reservoir 62.

Conversely, FIG. 11 shows material to be milled and a carrier (the solvent) pumped, for example, from the second reservoir 62, by pump 30, through second reservoir outlet valve 68 and open column bypass valve 48 and through the first milling unit 26. Material is prevented from passing through the second milling unit 58 by closing the second and third supply valves 70, 72. Also, reservoir bypass valve 50 and crossover valve 60 are closed. The first supply valve 64 is open so that flow from milling unit 26 is directed through the fourth supply valve 74 into the first reservoir 22. Material is prevented from returning into the second reservoir 62 by closing the second reservoir inlet valve 66. First reservoir valve 40 is closed so that material entering the first reservoir 22 flows into and not out of the first reservoir.

FIG. 12 illustrates a system 420 that includes components arranged like that of system 320 and adds two additional treatment columns 76, 78. Each of the three treatment columns 24, 76, 78 may therefore be configured to perform a different task, or multiples of the same task, which yields the most possible flexibility in preparing the system for operation and configuring the system 420 to perform different operations simultaneously.

For example, the first treatment column 24 may be configured to remove water from the solvent, when solvent is circulated through the column. The second treatment column 76 may be configured to remove oxygen from the solvent, when solvent is circulated through the column. The third treatment column 78 may be configured to remove impurities from the solvent, when solvent is circulated through the column.

Accordingly, the first treatment column 24 may include water sieves for the removal of water, such as molecular sieve desiccants, 3 Å molecular sieves, 4 Å molecular sieves, for example. The second treatment column 76 may include catalysts and/or scavenger compounds suitable for the removal of oxygen. The third treatment column 78 may include carbon in a suitable form for the removal of other impurities, such as organic molecules.

Alternatively, the columns 24, 76, 78 may be configured to perform the same task with different ones of the columns being in operation or not in operation, i.e., isolated for maintenance or other tasks, for example. Structurally, each of the second and third treatment columns 76, 78 include a respective column outlet valve 80, 82 to control flow.

The system 420 may have multiple pumps. For example, the second treatment column 76 may be in communication with out-feed from the second reservoir 62 and fed by second treatment column pump 84. The third treatment column 78 may be in communication with out-feed from the first reservoir 22 and fed by pump 86.

In operation, the configuration of FIG. 12 illustrates how different operations of the system 420 can be performed at the same time. The second reservoir 62 may be prepared for receiving material to be milled by circulating solvent through pump 84, into column 76 for removal of water, for example, from the solvent, passed through the open second column outlet valve 80 and returned to the second reservoir 62 with the second reservoir inlet valve 66 being closed. Closing the second reservoir outlet valve 68 prohibits solvent from exiting the reservoir and being directed to the first column 24 or either of the mills 26, 58. In this manner, the second reservoir 62 is isolated from the rest of the system 420 while being prepared for milling operation.

Simultaneously, material to be milled from the first reservoir 22 enters the system 420 through open reservoir outlet valve 40, is pumped via pump 30 through milling unit 26 via the column bypass valve 48 and is returned to the reservoir 22 via open first supply valve 64 and fourth supply valve 74. Closed third column outlet pump prevents flow from entering third column 78 and closed second supply valve 70 prevent flow of material from entering the outflow side of the second milling unit 58 and closed second reservoir inlet valve 66 prevents flow of material from entering the second reservoir 62. Therefore, milling and cleaning of different elements of the system 420 can proceed simultaneously, and continuous milling can be performed with no down time for adding material to be milled and removing milled material and also preparing the system for milling operations. Accordingly, a system 420 with maximum flexibility and low cost of operation is disclosed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

What is claimed:

1. A milling system, comprising:
    a reservoir shaped and sized to carry a solvent or a slurry comprising the solvent and a material to be milled;
    a treatment column in communication with the reservoir, the column configured to remove one or more of water, oxygen, or impurities from the solvent; and
    a mill in fluid communication with the reservoir, the mill configured to triturate the material when carried in the solvent; wherein the treatment column is disposed before the mill relative to a drying-process flow through the milling system.

2. The milling system of claim 1, wherein the mill is configured to mechanochemically functionalize a surface of the material to be milled.

3. The milling system of claim 1, wherein the milling system is configured to re-circulate the solvent through the reservoir, the treatment column, and the mill.

4. The milling system of claim 3, wherein the system includes a recirculation pump configured to circulate the solvent or the slurry to the mill and return the solvent or the slurry to the reservoir.

5. The milling system of claim 1, wherein the treatment column is configured to be fluidly, selectively isolated from the reservoir and the mill.

6. The milling system of claim 1, wherein the treatment column includes a desiccant.

7. The milling system of claim 6, wherein the desiccant are molecular sieves.

8. The milling system of claim 6, wherein the treatment column is configured for regeneration of the desiccant.

9. The milling system of claim 6, wherein the desiccant is adapted to reduce an amount of water from the solvent; wherein the solvent includes one or more of an alkane, an alkene, an alkyne, an arene, an alkyl halide, an aryl halide, an aldehyde, a ketone, an ester, an amide, an amine, and a nitrile.

10. A method comprising:
    providing a nonaqueous solvent;
    circulating the solvent through a mill and a treatment column configured to remove water from the solvent;
    monitoring or calculating an amount of water in the solvent; and thereafter
    operating the mill to triturate a material to be milled.

11. The method of claim 10, wherein said circulating further includes circulating the solvent through a reservoir shaped and sized to carry a slurry comprising the solvent and the material to be milled.

12. The method of claim 10, wherein circulating the solvent through the mill and the treatment column dries the mill; and drying the solvent to below a selected amount of water in the solvent.

13. The method of claim 12, further comprising, after drying the mill,
    introducing to the mill a slurry that includes the material to be milled; and
    triturating the material in the mill.

14. The method of claim 10, comprising isolating the treatment column from the mill and a reservoir during operation of the mill.

15. The method of claim 10, further comprising introducing to the mill a slurry including the material to be milled; and circulating the slurry through the treatment column during operation of the mill.

16. The method of claim 10, wherein the solvent includes one or more of an alkane, an alkene, an alkyne, an arene, an alkyl halide, an aryl halide, an aldehyde, a ketone, an ester, an amide, an amine, or a nitrile.

17. The method of claim 10, wherein the solvent includes an alkane, an alkene, an alkyne, or an arene.

18. A method of operating a mill, comprising:
providing a nonaqueous solvent;
circulating the solvent through the mill and a treatment column configured to remove water from the solvent;
reducing an amount of water in the solvent to less than about 1000 ppm; then introducing a material to be milled into the solvent to produce a slurry; and
operating the mill to triturate the material.

19. The method of claim 18, wherein said operating comprises:
a) pumping the slurry from a first reservoir into the mill;
b) milling the slurry in the mill;
c) pumping the slurry into a second reservoir;
d) pumping the slurry from the second reservoir into the mill;
e) milling the slurry in the mill;
f) pumping the slurry into the first reservoir; and
g) repeating a-f until the material in the slurry is milled to a predetermined specification.

20. The method of claim 18, wherein said circulating further includes circulating the solvent through at least one reservoir shaped and sized to carry the slurry comprising the solvent and the material to be milled.

* * * * *